US011205980B2

(12) United States Patent
Nishi et al.

(10) Patent No.: US 11,205,980 B2
(45) Date of Patent: Dec. 21, 2021

(54) MOTOR DRIVING CONTROL DEVICE

(71) Applicant: MINEBEA MITSUMI Inc., Nagano (JP)

(72) Inventors: Shuhei Nishi, Kitasaku-gun (JP); Tomohiro Inoue, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 28 days.

(21) Appl. No.: 16/821,388

(22) Filed: Mar. 17, 2020

(65) Prior Publication Data

US 2020/0304044 A1 Sep. 24, 2020

(30) Foreign Application Priority Data

Mar. 22, 2019 (JP) .............................. JP2019-055341

(51) Int. Cl.
| | | |
|---|---|---|
| *H02P 6/15* | (2016.01) | |
| *H02P 6/08* | (2016.01) | |
| *H02P 6/06* | (2006.01) | |
| *H02P 27/08* | (2006.01) | |
| *H02P 6/28* | (2016.01) | |
| *H02P 7/29* | (2016.01) | |
| *H02P 6/16* | (2016.01) | |

(52) U.S. Cl.
CPC .................. *H02P 6/15* (2016.02); *H02P 6/06* (2013.01); *H02P 6/08* (2013.01); *H02P 6/16* (2013.01); *H02P 6/28* (2016.02); *H02P 7/29* (2013.01); *H02P 27/08* (2013.01)

(58) Field of Classification Search
CPC .... H02P 1/00; H02P 1/04; H02P 21/00; H02P 1/16; H02P 1/24; H02P 1/46; H02P 1/465; H02P 1/50; H02P 3/00; H02P 4/00; H02P 5/00; H02P 6/00; H02P 6/005; H02P 6/06; H02P 6/08; H02P 6/12; H02P 6/14; H02P 7/00; H02P 21/003; H02P 21/0021; H02P 21/0089; H02P 21/08; H02P 21/10; H02P 21/12; H02P 21/22; H02P 21/26; H02P 21/28; H02P 23/00; H02P 27/00; H02P 27/04; H02P 27/06; H02P 27/08; H02P 6/15; H02P 7/29
USPC ............................... 318/400.02, 400.01, 801
See application file for complete search history.

(56) References Cited

U.S. PATENT DOCUMENTS

| | | | | |
|---|---|---|---|---|
| 9,325,264 | B2 * | 4/2016 | Iwaji ....................... | H02P 21/18 |
| 10,644,627 | B2 * | 5/2020 | Iwaji ....................... | H02P 6/187 |
| 2011/0193509 | A1 * | 8/2011 | Ooyama .................. | H02M 1/12 |
| | | | | 318/503 |
| 2014/0049198 | A1 * | 2/2014 | Ooyama .................. | H02M 1/12 |
| | | | | 318/400.09 |

(Continued)

FOREIGN PATENT DOCUMENTS

JP H08-126374 A 5/1996

*Primary Examiner* — Antony M Paul
(74) *Attorney, Agent, or Firm* — Pearne & Gordon LLP

(57) ABSTRACT

A motor driving control device has a motor driving unit configured to supply a current to coils of a motor, and a control unit configured to control an operation of the motor driving unit in a vector control mode. The control unit includes a state signal output unit configured to output a pulse signal indicating a predetermined value corresponding to a state of the motor or a control state of the control unit among values generated in a process of calculation processing in the vector control mode.

5 Claims, 4 Drawing Sheets

(56) References Cited

U.S. PATENT DOCUMENTS

2015/0069941 A1\* 3/2015 Iwaji ..................... H02P 6/183
318/400.11

\* cited by examiner

MOTOR DRIVING CONTROL DEVICE

CROSS REFERENCE TO RELATED APPLICATIONS

This application claims the benefit of Japanese Patent Application No. 2019-055341, filed Mar. 22, 2019, which is hereby incorporated by reference in its entirety.

BACKGROUND

Technical Field

The present disclosure relates to a motor driving control device, and more particularly, to a motor driving control device used for driving of a brushless motor.

Background

There has been conventionally proposed various configurations of a motor driving control device used for driving of a brushless motor (for example, see Japanese Patent Application Laid-Open No. 08-126374).

The present disclosure is related to providing a motor driving control device with high convenience.

SUMMARY

According to one aspect of the present disclosure, a motor driving control device includes a motor driving unit configured to supply a current to coils of a motor, and a control unit configured to control an operation of the motor driving unit in a vector control mode, wherein the control unit includes a state signal output unit configured to output a pulse signal indicating a predetermined value corresponding to a state of the motor or a control state of the control unit among values generated in a process of calculation processing in the vector control mode.

Preferably, the control unit includes a triangular-wave generation unit, the predetermined value is represented by a numerical value of a magnitude corresponding to the state of the motor or the control state of the control unit, and the state signal output unit outputs, as the pulse signal, a pulse width modulation signal generated by comparing the predetermined value with a triangular wave generated by the triangular-wave generation unit.

Preferably, the predetermined value is a q-axis current value indicating a torque of the motor, and a duty of the pulse signal is larger than a reference value when the torque of the motor is applied in a first direction, and is smaller than the reference value when the torque of the motor is applied in a direction opposite to the first direction.

Preferably, the control unit is configured to perform all or a part of the calculation processing in the vector control mode by a digital circuit, and the predetermined value is represented by a numerical value generated in a process of the calculation processing performed by the digital circuit.

Preferably, the control unit includes a signal input unit configured to output a target speed signal based on an input signal input from an outside, the target speed signal being used for the calculation processing in the vector control mode, and the signal input unit outputs the target speed signal based on a frequency of the input signal.

Preferably, the signal input unit includes a duty determination unit configured to determine a duty of the input signal, and the control unit determines a rotation direction of the motor based on a determination result of the duty determination unit.

According to the present disclosure, a motor driving control device with high convenience can be provided.

DETAILED DESCRIPTION

Hereinafter, a motor driving control device according to an embodiment of the present disclosure will be described.

EMBODIMENTS

Figure 1:
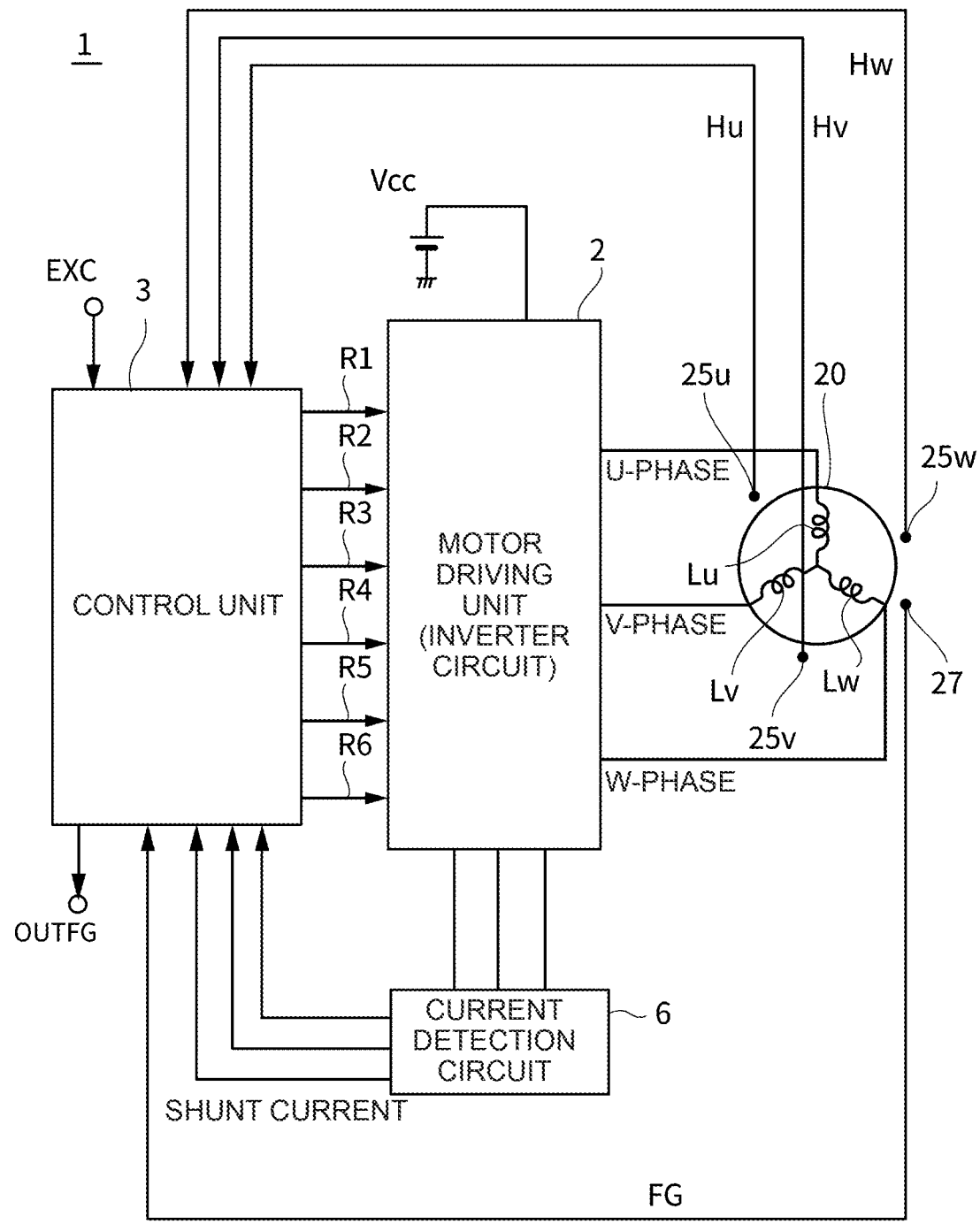
FIG. 1 is a diagram illustrating a circuit configuration of a motor driving control device according to an embodiment of the present disclosure.

FIG. 1 is a diagram illustrating a circuit configuration of a motor driving control device according to an embodiment of the present disclosure.

As illustrated in FIG. 1, the motor driving control device 1 is configured to drive a motor 20 by supplying a drive current to the motor 20. In the present embodiment, the motor 20 is, for example, a three-phase brushless motor having coils Lu, Lv, and Lw of U-phase, V-phase, and W-phase.

The motor driving control device 1 rotates the motor 20 by supplying a drive current to the coils Lu, Lv and Lw of the respective phases of the motor 20 based on a signal corresponding to a rotation of a rotor of the motor 20.

In the present embodiment, three Hall elements 25u, 25v and 25w for outputting signals according to the rotational position of the motor 20 are arranged in the motor 20 in connection with the coils Lu, Lv and Lw of the respective phases, the Hall elements serving as position detection sensors. The three Hall elements 25u, 25v and 25w are arranged, for example, at substantially equal intervals (at an interval of 120 degrees between the adjacent Hall elements) around the rotor of the motor 20. The Hall elements 25u, 25v and 25w detect the magnetic poles of the rotor and output Hall signals Hu, Hv and Hw, respectively. The Hall signals Hu, Hv and Hw are signals indicating the rotational position of the rotor of the motor 20. The rotational position of the rotor can be estimated based on the Hall signals Hu, Hv and Hw.

The motor driving control device 1 includes a motor driving unit 2 having a plurality of switching elements and is configured to supply a drive current to the three-phase coils Lu, Lv and Lw of the motor 20, a control unit 3 configured to control an operation of the motor driving unit 2, and a current detection circuit 6 configured to detect a voltage value corresponding to the magnitude of the current flowing in each of the three-phase coils Lu, Lv and Lw of the motor 20. The control unit 3 outputs, to the motor driving unit 2, gate signals R1 to R6 for operating the plurality of switching elements to subsequentially switch the energization pattern of the three-phase coils Lu, Lv and Lw. Note that the components of the motor driving control device 1 illustrated in FIG. 1 are a part of the whole of the motor driving control device 1, and the motor driving control device 1 may include other components in addition to the components illustrated in FIG. 1.

In the present embodiment, the motor driving control device 1 is an integrated circuit device (IC). The whole of the motor driving control device 1 is packaged in the integrated circuit device. Note that a part of the motor driving control device 1 may be packaged as one integrated circuit device or the whole or a part of the motor driving control device 1 may be packaged together with another device to form one integrated circuit device.

The motor driving unit 2 selectively energizes the three-phase coils of the motor 20. The motor driving unit 2 includes an inverter circuit having six switching elements for supplying a drive current to each of the coils Lu, Lv and Lw of the motor 20. The motor driving unit 2 selectively energizes the coils Lu, Lv and Lw of the motor 2 based on the gate signals R1 to R6 output from the control unit 3 to rotate the motor 20. The control unit 3 outputs the gate signals R1 to R6 and controls the on/off operation of each of the switching elements provided in the inverter circuit. In other words, upon output of the gate signals R1 to R6, the switching elements corresponding to the respective gate signals R1 to R6 are turned on or off, so that the drive signal is output to the motor 20 and electric power is supplied to each phase of the motor 20.

The current detection circuit 6 detects a voltage value corresponding to the magnitude of the drive current of each phase of the motor 20. In the present embodiment, the current detection circuit 6 includes shunt resistors arranged between the inverter circuit and the ground potential (the negative electrode of the power supply Vcc), and detects the voltage value corresponding to the coil current of each of the phases of the coils Lu, Lv and Lw of the motor 20. That is, the coil currents flowing through the respective phases of the coils Lu, Lv and Lw of the motor 20 pass through the inverter circuit, pass through respective the shunt resistors, and flow to the ground potential. The current detection circuit 6 can detect the magnitude of the coil current of the motor 20 as a voltage value from the voltage across the shunt resistor of each phase. The current detection circuit 6 outputs a shunt current signal as a detection result corresponding to the magnitude of the drive current of the motor 20. The shunt current signal of each phase is input to the control unit 3.

In the present embodiment, the Hall signals Hu, Hv and Hw, an FG signal FG, the shunt current signals, and an input signal EXC are input to the control unit 3.

The hall signals Hu, Hv and Hw are input from the motor 20 to the control unit 3. The control unit 3 outputs a drive control signal Sd using the three Hall elements 25u, 25v and 25w. When no pattern FG signal is present described later, the control unit 3 obtains rotational speed information of the motor 20 using the Hall signals Hu, Hv and Hw, and controls the driving of the motor 20. Furthermore, the control unit 3 detects the rotational position of the rotor of the motor 20 using the Hall signals Hu, Hv and Hw, and controls the driving of the motor 20.

The FG signal FG is a signal corresponding to the rotation of the rotor of the motor 20, that is, the rotational speed information of the motor 20. In the present embodiment, a coil pattern 27 is formed on a substrate on a rotor side of the motor 20, and the FG signal FG is a signal (pattern FG) generated using the coil pattern 27. The FG signal FG is input to the control unit 3 after passing through a noise filter.

The input signal EXC is input, for example, from the outside of the control unit 3. The input signal EXC is a signal related to a target speed of the motor 20, or the like. The detail of the input signal EXC will be described later.

The control unit 3 comprises, for example, an ASIC (application specific high-density integrated circuit) performing processes by a digital circuit (hardware processing). The control unit 3 outputs the gate signals R1 to R6 for driving the motor 20 to the motor driving unit 2, and controls the rotation of the motor 20. The control unit 3 outputs the gate signals R1 to R6 to the motor driving unit 2 based on the input signal. The control unit 3 outputs the gate signals R1 to R6 to control the rotation of the motor 20 and rotates the motor 20 at the rotational speed corresponding to the input signal EXC.

[Description of Control Unit 3]

In the present embodiment, the control unit 3 controls the operation of the motor driving unit 2 in a vector control mode. The control unit 3 is configured to perform all or a part of the calculation processing in the vector control mode by a digital circuit. Note that the control unit 3 may be configured to perform a part of the calculation processing in the vector control mode by the distal circuit and the other calculation process by executing a program using a microcomputer or the like. Alternatively, the control unit 3 may be configured to perform all of the calculation processing in the vector control mode by executing the program using a microcomputer or the like.

Figure 2:
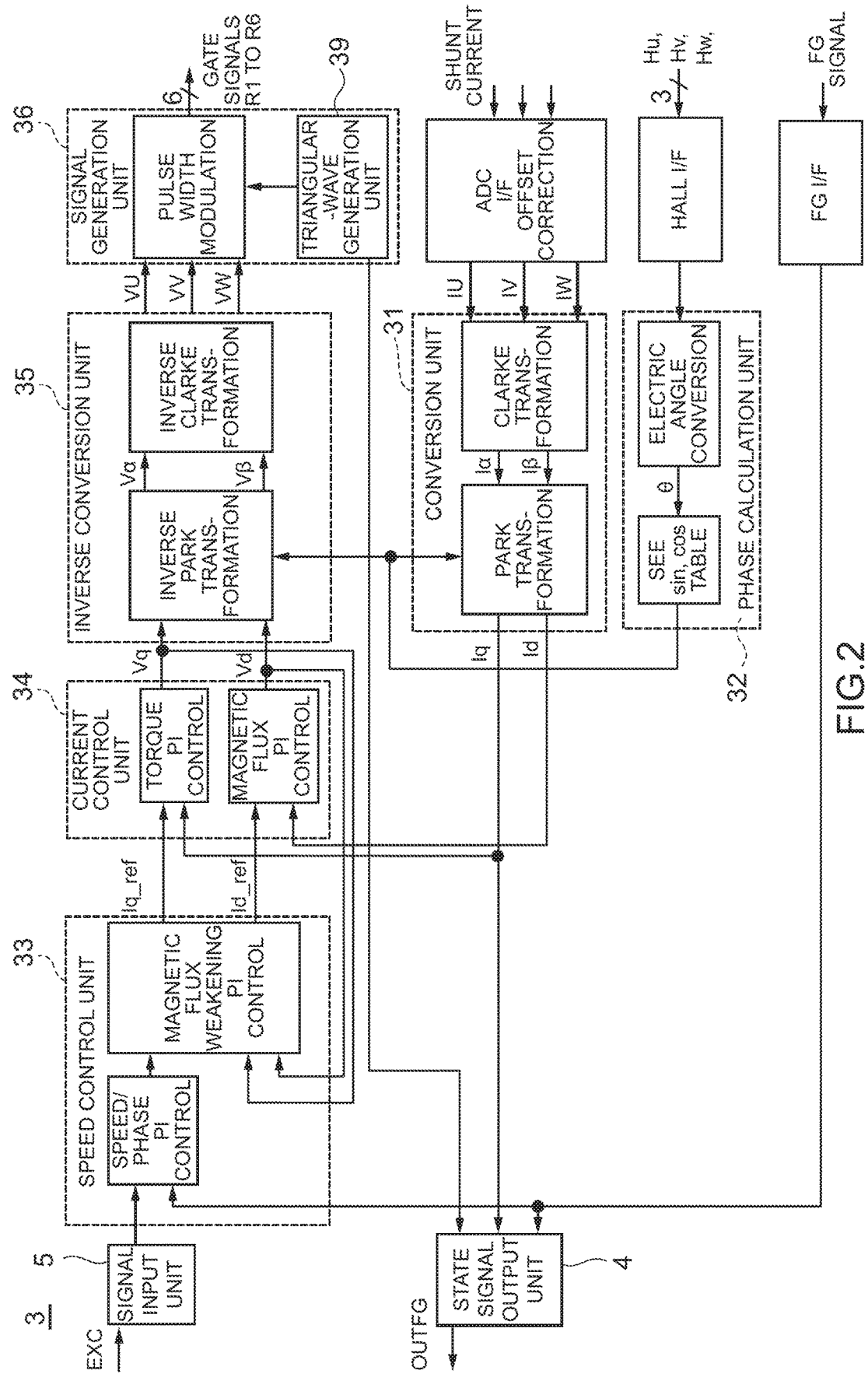
FIG. 2 is a block diagram illustrating a configuration of a control unit.

FIG. 2 is a block diagram illustrating a configuration of the control unit 3.

As illustrated in FIG. 2, the control unit 3 includes a state signal output unit 4 and a signal input unit 5. The control unit 3 also includes a conversion unit 31, a phase calculation unit 32, a speed control unit 33, a current control unit 34, an inverse conversion unit 35, and a signal generation unit 36, performing calculation processing in the vector control mode, and input interfaces of shunt current values, the Hall signals Hu, Hv and Hw, and the FG signal FG.

The three-phase shunt currents are input to the conversion unit 31 after being converted from analog to digital form and being subject to offset correction. The conversion unit 31 performs the phase conversion and the coordinate axis conversion (specifically, for example, Clarke transformation and Park transformation) based on the input three-phase shunt current values IU, IV and IW, and outputs a torque current value (q-axis current value) Iq and a magnetic flux current value Id. Each of the torque current value Iq and the magnetic flux current value Id is an actual current value that varies depending on the operating state of the motor 20.

The Hall signals Hu, Hv and Hw are input to the phase calculation unit 32 through the input interface. The phase calculation unit 32 performs the electric angle conversion based on the input Hall signals Hu, Hv and Hw, and, based on the results, outputs a sine value and a cosine value. The output values are used for the Park transformation in the conversion unit 31 and the inverse Park transformation in the inverse conversion unit 35 described later. The sine value and the cosine value are obtained by referring to a predetermined look-up table based on the results of the electric angle conversion, for example, but may be obtained by calculation processing.

A target speed signal, the FG signal FG, and a torque output voltage value Vq and a magnetic flux output voltage value Vd are input to the speed control unit 33, the target speed signal being output from the signal input unit 5 and indicating a target rotational speed of the motor 20, the FG signal FG being input through the input interface, and the torque output voltage value Vq and the magnetic flux output voltage value Vd being output from the current control unit 34 described later. The speed control unit 33 performs the PI control based on the input signals. That is, the speed control unit 33 performs the speed phase PI control and the magnetic flux weakening PI control. The speed control unit 33 outputs a torque current command value Iq_ref and a magnetic flux current command value Id_ref.

The torque current command value Iq_ref and the magnetic flux current command value Id_ref, and the torque current value Iq and the magnetic flux current value Id are input to the current control unit 34, the torque current command value Iq_ref and the magnetic flux current command value Id_ref being output, as command values, from the speed control unit 33, and the torque current value Iq and the magnetic flux current value Id being output, as actual current values, from the conversion unit 31. The current control unit 34 performs the PI control based on the torque current command value Iq_ref and the torque current value Iq, and outputs a torque output voltage value Vq. The current control unit 34 performs the PI control based on the magnetic flux current command value Id_ref and the magnetic flux current value Id, and outputs the magnetic flux output voltage value Vd.

The torque output voltage value Vq and the magnetic flux output voltage value Vd are input to the inverse conversion unit 35. The inverse conversion unit 35 performs the coordinate axis conversion and the phase conversion (specifically, for example, inverse Park transformation and inverse Clarke transformation) based on the torque output voltage value Vq and the magnetic flux output voltage value Vd, and outputs voltage values VU, VV and VW of the respective three phases.

The voltage values VU, VV and VW output from the inverse conversion unit 35 are input to the signal generation unit 36. A triangular-wave generation unit 39 is provided in the signal generation unit 36. The signal generation unit 36 converts the waveform to the two-phase modulation or the three-phase modulation (superposition of triple waves) based on the input voltage values VU, VV and VW, performs the pulse width modulation based on the triangular wave generated by the triangular-wave generation unit 39, and outputs the gate signals R1 to R6.

The FG signal FG, the torque current value Iq output from the conversion unit 31, and the triangular wave output from the signal generation unit 36 (the triangular wave generated by the triangular-wave generation unit 39) are input to the state signal output unit 4. The state signal output unit 4 outputs an output signal OUTFG based on the input signal. The output signal OUTFG is input to, for example, a host device for monitoring the operation of the motor driving control device 1 or the like, and is used. The configuration of the state signal output unit 4 will be described later.

The input signal EXC is input to the signal input unit 5. The signal input unit 5 outputs, to the speed control unit 33, the target speed signal indicating the target rotational speed of the motor 20 or the like, based on the input signal EXC. The configuration of the signal input unit 5 will be described later.

Figure 3:
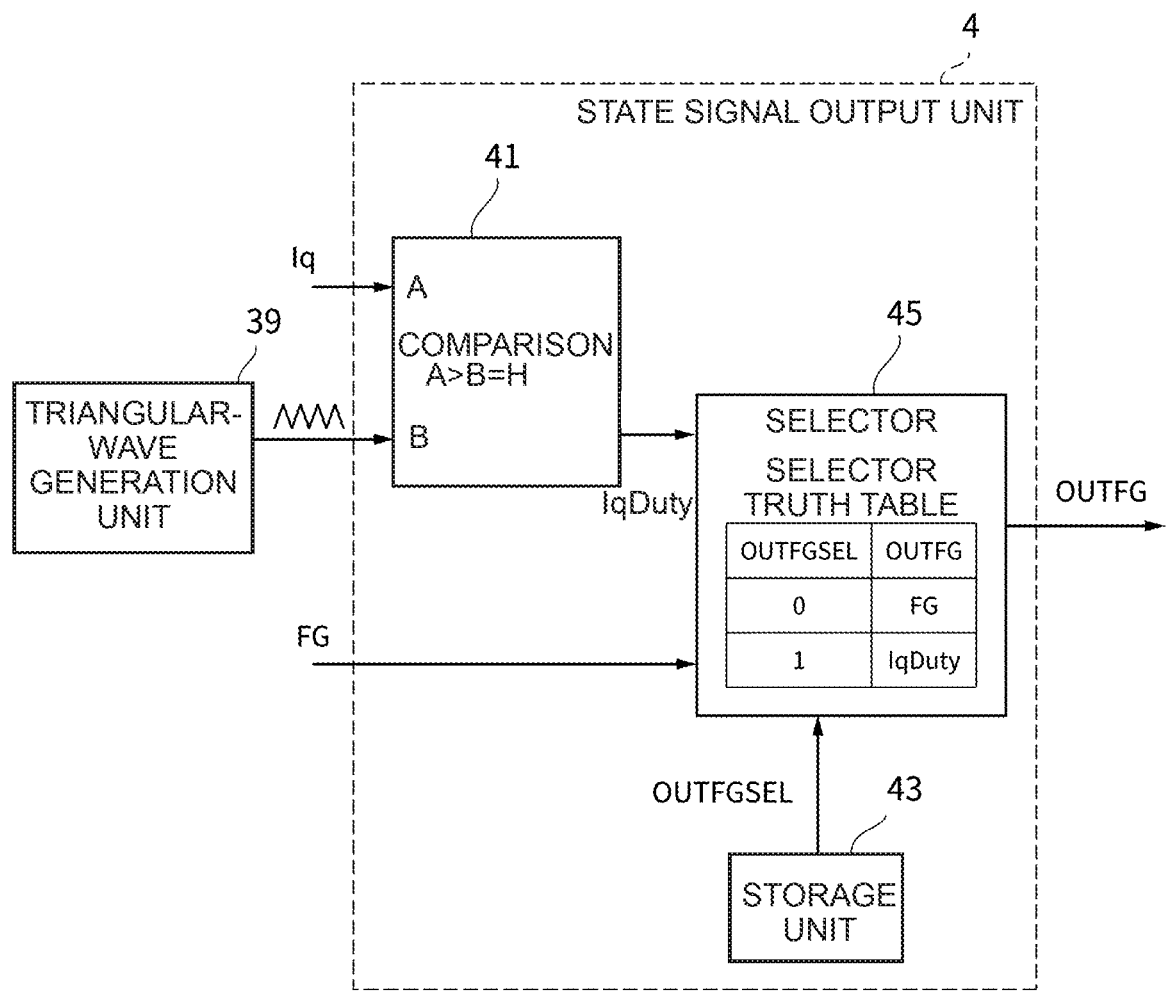
FIG. 3 is a diagram illustrating a configuration of a state signal output unit.

FIG. 3 is a diagram illustrating a configuration of the state signal output unit 4.

The state signal output unit 4 is configured to be capable of outputting, as an output signal OUTFG, a pulse signal indicating a predetermined value corresponding to a state of the motor 20 or a control state of the control unit 3 among values generated in the process of the calculation processing in the vector control mode. The state signal output unit 4 is configured to be capable of switching between outputting, as the output signal OUTFG, the pulse signal indicating a predetermined value corresponding to the state of the motor 20 or the control state of the control unit 3 among values generated in the process of the calculation processing in the vector control mode and outputting, as the output signal OUTFG, the other signal. The switching of the signal as the output signal OUTFG is performed based on a predetermined setting value.

More specifically, in the present embodiment, the state signal output unit 4 is configured to be capable of outputting, as the output signal OUTFG, a pulse signal indicating a torque current value Iq. The torque current value Iq is a predetermined value corresponding to the state of the motor 20 among the values generated in the process of the calculation processing in the vector control mode. In addition, the state signal output unit 4 is configured to be cable of switching between outputting, as the output signal OUTFG, the pulse signal indicating a torque current value Iq and outputting, as the output signal OUTFG, the FG signal FG.

As illustrated in FIG. 3, the state signal output unit 4 includes a comparison unit 41, a storage unit 43, and a selector 45.

The torque current value Iq and the triangular wave generated in the triangular-wave generation unit 39 are input to the comparison unit 41. The torque current value Iq has a numerical value of the magnitude corresponding to the state of the torque of the motor 20. In other words, the torque current value Iq is represented by a numerical value generated in the process of the calculation processing in the vector control mode which is performed by the digital circuit. The comparison unit 41 compares the torque current value Iq with the numerical value of the triangular wave to generate a pulse width modulation signal IqDuty of a duty indicating the torque current value Iq. The state signal output unit 4 outputs the generated pulse width modulation signal IqDuty to the selector 45.

Here, the duty of the pulse width modulation signal IqDuty is larger than a reference value when a torque of the motor 20 is applied in a first direction, and is smaller than the reference value when the torque of the motor 20 is applied in a second direction opposite to the first direction. In the present embodiment, the reference value is, for example, 50 percent. That is, the duty of the pulse width modulation signal IqDuty becomes 50 percent when the torque current value Iq is zero, the duty of the pulse width modulation signal IqDuty is larger than 50 percent when the torque current value Iq is positive (when the torque is applied in the first direction), and the duty of the pulse width modulation signal IqDuty is smaller than 50 percent when the torque current value Iq is negative (when the torque is applied in the second direction). Thus, the direction and magnitude of the torque current value Iq can be known from the duty of the pulse width modulation signal IqDuty.

The pulse width modulation signal IqDuty and the FG signal FG are input to the selector 45. In addition, a selection signal OUTFGSEL stored in the storage unit 43 is input to the selector 45. The storage unit 43 is, for example, a memory. The selector 45 outputs, as the output signal OUTFG, either the pulse width modulation signal IqDuty or the FG signal FG based on the selection signal OUTFGSEL. In the present embodiment, when the selection signal OUTFGSEL is "0," the FG signal FG is output as the output signal OUTFG. When the selection signal OUTFGSEL is "1," the pulse width modulation signal IqDuty is output as the output signal OUTFG. Note that a voltage value for specifying a signal output as the selection signal OUTFGSEL may be input to the selector 45.

Note that a pulse signal which is output, as the output signal OUTFG, by the state signal output unit 4 is not limited to a signal indicating the torque current value Iq, but may be a signal indicating a predetermined value corresponding to the state of the motor 20 or the control state of the control unit 3 among the values generated in the process of the calculation processing in the vector control mode. Regarding various predetermined values represented by numerical values generated in the process of the calculation processing in the vector control mode which is performed by the digital circuit, the various predetermined values including, for example, the torque output voltage value Vq, the magnetic flux output voltage value Vd, the magnetic flux current value Id, and the sign value or the cosine value, the state signal output unit 4 may be configured to output the pulse signal indicating the predetermined value as the output signal OUTFG. When the predetermined value has a voltage corresponding to the magnitude of the predetermined value, the state signal output unit 4 can output, as the pulse signal, a pulse width modulation signal generated by comparing the predetermined value with the triangular wave generated by the triangular-wave generation unit 39.

Figure 4:
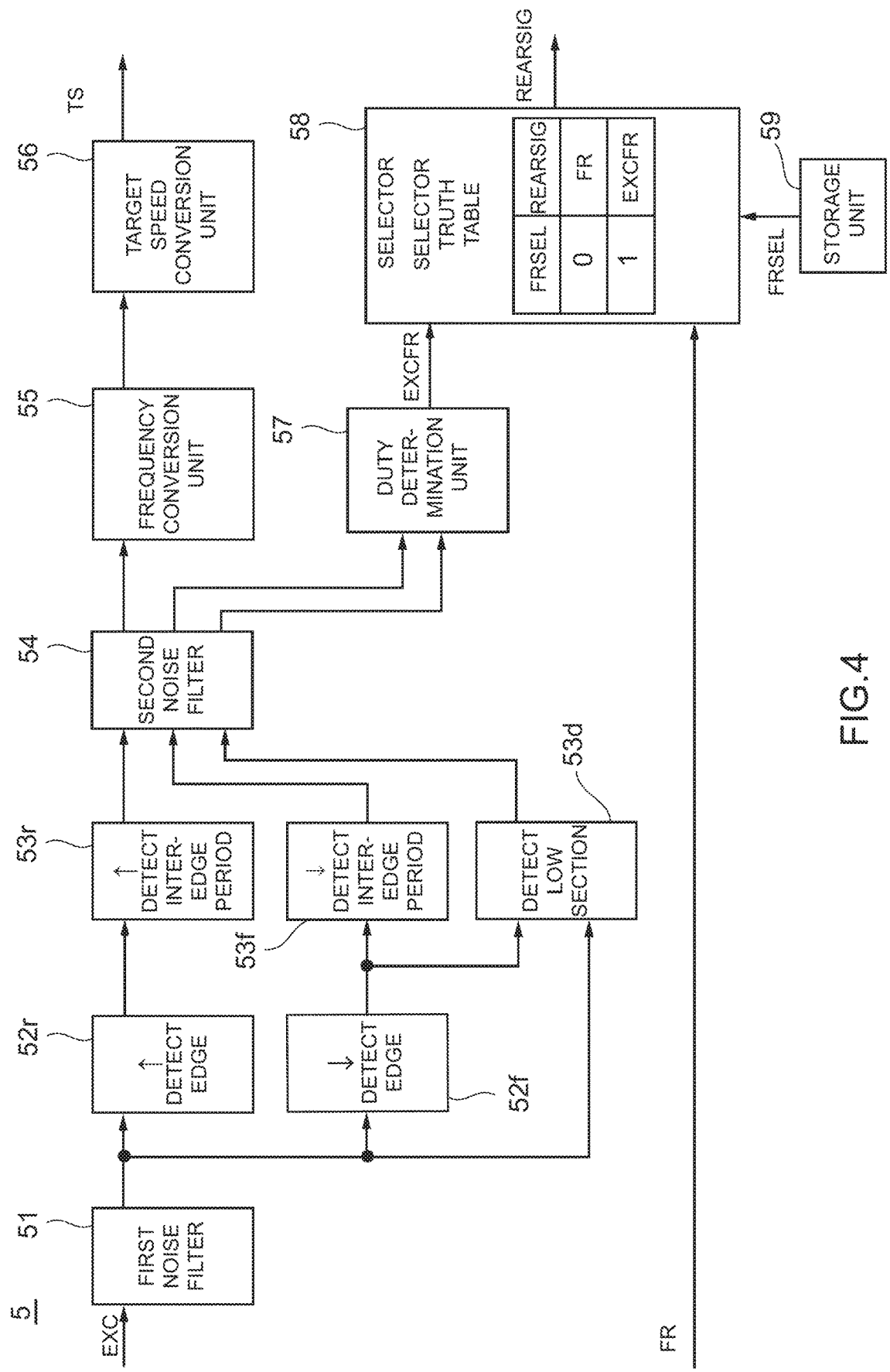
FIG. 4 is a diagram illustrating a configuration of a signal input unit.

FIG. 4 is a diagram illustrating a configuration of the signal input unit 5.

The signal input unit 5 outputs a target speed signal TS based on the input signal EXC input from the outside, the target speed signal TS being used for the calculation processing in the vector control mode. In addition, the signal input unit 5 outputs a specifying signal REARSIG for specifying a rotation direction of the motor 20. The speed control unit 33 is operated based on the target speed signal TS output from the signal input unit 5. That is, the control unit 3 controls the rotational speed of the motor 20 based on the target speed signal TS. In addition, the control unit 3 determines the rotation direction of the motor 20 based on the specifying signal REARSIG.

In the present embodiment, the input signal EXC is a signal corresponding to the target rotational speed of the motor 20. In other words, the input signal EXC is information corresponding to a target value of the rotational speed of the motor 20. In the present embodiment, a pulse signal having a frequency corresponding to the target rotational speed of the motor 20 and a duty corresponding to the rotation direction desired to be specified of the motor 20 can be used as the input signal EXC to be input to the motor driving control device 1. When such an input signal EXC is input, the signal input unit 5 can output the target speed signal TS based on the frequency of the input signal EXC and output, as the specifying signal REARSIG, a first rotation direction signal EXCFR for specifying a rotation direction corresponding to the duty of the input signal EXC.

As illustrated in FIG. 4, the signal input unit 5 includes a first noise filter 51, two edge detection units 52*r* and 52*f*, two inter-edge period detection units 53*r* and 53*f*, a low section detection unit 53*d*, a second noise filter 54, a frequency conversion unit 55, a target speed conversion unit 56, a duty determination unit 57, a selector 58, and a storage unit 59. In addition to the input signal EXC, a second rotation direction signal FR can be input to the signal input unit 5 from the outside.

The input signal EXC is input to the two edge detection units 52*r* and 52*f* and the low section detection unit 53*d* through the first noise filter 51. In the first noise filter 51, the noise is removed and measures against metastable are performed. That is, the measures against metastable are performed by clock-shifting the input signal EXC by a predetermined number based on a clock signal having a predetermined frequency. Then, an input having a pulse width for a predetermined time or more is output as a pulse of the input signal EXC.

When rising edges of the input signal EXC passing through the first noise filter 51 are detected by the rising edge detection unit 52*r*, the period between the rising edges is detected by the inter-rising edge period detection unit 53*r*. In addition, when falling edges of the input signal EXC are detected by the falling edge detection unit 52*f*, the period between the falling edges is detected by the inter-falling edge period detection unit 53*f*. The detection results of the falling edge detection unit 52*f* are also input to the low section detection unit 53*d*. The low section detection unit 53*d* detects a low section based on the input information. The detection results of the inter-edge period detection units 53*r* and 53*f* and the detection result of the low section detection unit 53*d* are input to the second noise filter 54.

The second noise filter 54 is configured not to detect that originally unintended pulse has been input at the timing when the frequency of the input signal EXC is switched, for example, to thereby prevent the occurrence of a malfunction. Specifically, the second noise filter 54 measures and compares the period between the rising edges of the input signal EXC and the period between the falling edges of the input signal EXC. For example, when the period between the falling edges falls within a predetermined range based on the period between the rising edges, it can be said that the input signal EXC is in a stable state (does not include unintended pulse). In this case, the second noise filter 54 outputs a count value of the period between the falling edges.

The frequency conversion unit 55 generates the frequency information based on the count value of the period between the falling edges which is output from the second noise filter 54. The target speed conversion unit 56 converts the generation result of the frequency conversion unit 55 and outputs the target speed signal TS.

The duty determination unit 57 determines the duty of the input signal EXC. The duty determination unit 57 determines the duty of the input signal EXC based on, but not limited to, for example, the period between the falling edges and the detection result of the low section detection unit 53*d*. The falling edges is input through the second noise filter 54.

In addition, the duty determination unit 57 outputs the first rotation direction signal EXCFR based on the determination result of the duty. The first rotation direction signal EXCFR is a signal for commanding whether the motor 20 rotates in a clockwise direction or in a counterclockwise direction. In the present embodiment, the first rotation direction signal EXCFR becomes a signal for commanding the clockwise rotation when the duty is larger than a first predetermined value, and becomes a signal for commanding the counterclockwise rotation when the duty is smaller than a second predetermined value. The second predetermined value is smaller than the first predetermined value. That is, even when the duty of the input signal EXC slightly fluctuates, the rotation direction indicated by the first rotation direction signal EXCFR is consistent.

More specifically, in the present embodiment, the duty determination unit 57 determines the duty and commands the rotation direction as follows, for example. That is, firstly, the count value of the period between the falling edges is set as the count value of one period of the input signal EXC. The count value which is a detection result of the low section detection unit 53*d* is set as the count value of the low section of the input signal EXC. Therefore, the count value of the high section of the input signal EXC is a value obtained by subtracting the count value of the low section from the count value of one period. When a value obtained by adding a value obtained by dividing the count value of one period by 2 and a value obtained by dividing the count value of one period by 16 is regarded as a threshold, each of the count value of the high section and the count value of the low section is compared with the threshold. When the count value of the high section is larger than the threshold, an H flag signal is set to "1." When the count value of the low section is larger than the threshold, an L flag signal is set to "1." When the present rotation direction is L (counterclockwise direction) and the H flag signal is set to "1," the rotation direction is switched to H (clockwise direction). When the present rotation direction is H (clockwise direction and the L flag signal is set to "1," the rotation direction is switched to L (counterclockwise direction).

The first rotation direction signal EXCFR is input to the selector 58. In addition, the second rotation direction signal FR can be input to the selector 58 from the outside of the control unit 3. A selection signal FRSEL stored in the storage unit 59 which is, for example, a memory is input to the selector 58. The selector 58 outputs, as a specifying signal REARSIG, either the first rotation direction signal EXCFR or the second rotation direction signal FR based on the selection signal FRSEL. In the present embodiment, when the selection signal FRSEL is "0," the second rotation direction signal FR is output as the specifying signal REARSIG. When the selection signal FRSEL is "1," the first rotation direction signal EXCFR is output as the specifying signal REARSIG. Note that a voltage value for specifying a signal output as the selection signal FRSEL may be input to the selector 58. When the first rotation direction signal EXCFR which is a determination result of the duty determination unit 57 is output as the specifying signal REARSIG, the control unit 3 determines the rotation direction of the motor 20 based on the first rotation direction signal EXCFR.

As described above, in the present embodiment, the state signal output unit 4 can output the pulse signal indicating the torque current value Iq as the output signal OUTFG. Accordingly, since the host device can easily know the torque of the motor 20 as needed, based on the output signal OUTFG, the convenience of the motor driving control device 1 can be improved. It is conventionally conceivable that the torque of the motor 20 is detected based on the magnitude of the current flowing in the motor 20, for example. However, when the torque is thus detected based on the magnitude of the current, delay may be caused by the filter provided for removing the noise, resulting that it takes time for the detection. In such a case, the motor driving control device 1 is difficult to use for control of apparatuses according to the torque of the motor 20. On the other hand, since the motor driving control device 1 according to the present embodiment can easily know the torque of the motor 20 as needed, the motor driving control device 1 is suitable for immediately controlling the apparatuses according to the torque of the motor 20.

Since the state signal output unit 4 can appropriately set whether to output, as the output signal OUTFG, the pulse signal indicating the torque current value Iq or the FG signal FG, the convenience of the motor driving control device 1 can be improved. The pulse signal indicating the torque current value Iq is generated using a triangular wave generated by the triangular-wave generation unit 39. Accordingly, the pulse signal indicating the torque current value Iq can be easily generated without increasing a circuit scale.

The signal input unit 5 can output the target speed signal TS based on a signal input signal EXC and the first rotation direction signal EXCFR as a specifying signal REARSIG, a first rotation direction signal EXCFR for commanding a rotation direction of the motor 20. Since at least two types of command information about the target speed and the rotation direction can be obtained using one signal transmission path from the outside to the control unit 3, the number of terminals of the control unit 3 can be reduced and the number of wires connecting between the motor driving control device 1 and the host device can be reduced.

As an example, in a conventional motor driving control device, four ports are provided for controlling the motor 20. That is, the four ports include a target speed (EXC) port, a start/stop (S/S) port, a brake/brake release (BR) port and a rotation direction switching (FR) port. On the other hand, in the present embodiment, the control can be performed using one port as an interface between the motor driving control device and the host device in a similar manner as the conventional device. That is, the target speed, the rotation direction, and the start and free run stop/brake stop can be controlled by the frequency of the input signal EXC, the duty of the input signal, turning on and off of the input signal EXC, respectively. The free run stop and the brake stop can be switched by setting of a built-in memory. Accordingly, the number of wires connecting between the motor driving control device 1 and the host device can be reduced.

In the signal input unit 5, the selector 58 can select whether to output, as the specifying signal REARSIG, the first rotation direction signal EXCFR or the second rotation direction signal FR. Accordingly, the motor driving control device 1 can be also used for a conventional host device having an interface, and the convenience of the motor driving control device 1 can be improved.

[Others]

A circuit configuration of a motor driving control device is not limited to the above-described embodiment. Various circuit configurations configured to meet the object of the present disclosure can be applied. In the above-described embodiment, a part of components and functions may be omitted. For example, one of the signal input unit and the state signal output unit may be provided and the other may not be provided.

The motor to be drive by the motor driving control device of the present embodiment is not limited to a brushless motor, but may be another type of motor.

The predetermined current threshold to be compared with the drive current of the motor can be arbitrarily set.

No particular limitation is imposed on specific contents of the rotor position detection method, the rotational speed detection method, and the control in the vector control mode. The position detection signal of the motor may be obtained using a detector different from the Hall element. For example, a Hall IC or the like may be used. Also, for example, the number of Hall elements is not limited to three. The driving may be performed in so-called one-sensor mode using one Hall element.

It is to be understood that the above-described embodiment is illustrative in all respects and is not restrictive. The scope of the present disclosure is defined not by the above description, but by the scope of the claims, and it is intended to include meanings equivalent to the claims and all changes within the scope.

What is claimed is:

1. A motor driving control device, comprising:
   a motor driving unit configured to supply a current to coils of a motor; and
   a control unit configured to control an operation of the motor driving unit in a vector control, wherein the control unit includes a state signal output unit configured to output a pulse signal indicating a predetermined value corresponding to a state of the motor or a control state of the control unit among values generated in a process of calculation processing by the vector control, the control unit includes a triangular-wave generation unit, the predetermined value is represented by a numerical value of a magnitude corresponding to the state of the motor or the control state of the control unit, and the state signal output unit outputs, as the pulse signal, a pulse width modulation signal generated by comparing the predetermined value with a triangular wave generated by the triangular-wave generation unit.

2. The motor driving control device according to claim 1, wherein the control unit is configured to perform all or a part of the calculation processing in the vector control by a digital circuit, and the predetermined value is represented by a numerical value generated in a process of the calculation processing performed by the digital circuit.

3. A motor driving control device, comprising:

a motor driving unit configured to supply a current to coils of a motor; and a control unit configured to control an operation of the motor driving unit in a vector control, wherein the control unit includes a state signal output unit configured to output a pulse signal indicating a predetermined value corresponding to a state of the motor or a control state of the control unit among values generated in a process of calculation processing by the vector control, the predetermined value is a q-axis current value indicating a torque of the motor, and a duty of the pulse signal is larger than a reference value when the torque of the motor is applied in a first direction, and is smaller than the reference value when the torque of the motor is applied in a second direction opposite to the first direction.

4. A motor driving control device, comprising:

a motor driving unit configured to supply a current to coils of a motor; and a control unit configured to control an operation of the motor driving unit in a vector control, wherein the control unit includes a state signal output unit configured to output a pulse signal indicating a predetermined value corresponding to a state of the motor or a control state of the control unit among values generated in a process of calculation processing by the vector control, the control unit includes a signal input unit configured to output a target speed signal based on an input signal input from an outside, the target speed signal being used for the calculation processing in the vector control, and the signal input unit outputs the target speed signal based on a frequency of the input signal.

5. The motor driving control device according to claim 4, wherein the signal input unit includes a duty determination unit configured to determine a duty of the input signal, and the control unit determines a rotation direction of the motor based on a determination result of the duty determination unit.

\* \* \* \* \*